United States Patent [19]
Ito

[11] Patent Number: 5,648,910
[45] Date of Patent: Jul. 15, 1997

[54] METHOD OF AUTOMATICALLY OPTIMIZING POWER SUPPLY NETWORK FOR SEMI-CUSTOM MADE INTEGRATED CIRCUIT DEVICE

[75] Inventor: Soichi Ito, Tokyo, Japan

[73] Assignee: NEC Corporation, Tokyo, Japan

[21] Appl. No.: 25,837

[22] Filed: Mar. 3, 1993

[30] Foreign Application Priority Data

Mar. 10, 1992 [JP] Japan .................................. 4-051179

[51] Int. Cl.$^6$ .............................. G06F 17/50; G06T 7/60
[52] U.S. Cl. ............................. 364/490; 364/489
[58] Field of Search ........................... 364/488, 491, 364/490, 578

[56] References Cited

U.S. PATENT DOCUMENTS

| | | | |
|---|---|---|---|
| 4,698,760 | 10/1987 | Lembach et al. | 364/490 |
| 4,890,238 | 12/1989 | Klein et al. | 364/491 |
| 5,010,493 | 4/1991 | Matsumoto et al. | 364/490 |
| 5,032,991 | 7/1991 | Davidson et al. | 364/488 |
| 5,165,086 | 11/1992 | Kamejma et al. | 364/488 |
| 5,237,514 | 8/1993 | Curtin | 364/490 |
| 5,404,310 | 4/1995 | Mitsuhashi | 364/490 |

OTHER PUBLICATIONS

Chowdhurry et al., "Optimum Design of IC Power/Ground Nets Subject to Reliability Constraints," IEEE, pp. 787–796, 1988.

Wolff, Sr., "Power/Timing: Optimization and Layout Techniques for LSI Chips," Design Automation of Fault Tolerant Computing, pp. 145–164, 78.

Cong et al., "Simultaneous Driver and Wire Sizing for Performance and Power Optimization," IEEE, pp. 408–425, 1994.

Primary Examiner—Kevin J. Teska
Assistant Examiner—Thai Phan
Attorney, Agent, or Firm—Laff, Whitesel, Conte & Saret, Ltd.

[57] ABSTRACT

A method of optimizing a power supply network is executed by a CAD system, and estimates current consumptions of component function blocks, then determining routes of power supply lines in such a manner as to pass through areas with local maximum values of the estimated current consumption, determining the entire route of the power supply network, finally regulating width of each power supply line incorporated in the power supply network on the basis of the amount of current passing therethrough so that the power supply network is free from electromigration.

6 Claims, 8 Drawing Sheets

METHOD OF AUTOMATICALLY OPTIMIZING POWER SUPPLY NETWORK FOR SEMI-CUSTOM MADE INTEGRATED CIRCUIT DEVICE

FIELD OF THE INVENTION

This invention relates to a method of arranging power supply lines for a semiconductor integrated circuit device and, more particularly, to a method of an optimizing power supply network for a semi-custom made integrated circuit device including function blocks.

DESCRIPTION OF THE RELATED ART

Conventionally, power supply networks are designed for semicustom-made integrated circuit devices as follows. In case of a gate array, power supply lines of the power supply network are previously assigned predetermined areas on the semiconductor substrate, and the wiring widths are also previously selected from available values regardless of a function achieved by the gate array. While the gate array is designed for a customer by the aid of a CAD (Computer-Aided-Design) system, the designer assigns signal lines on the semiconductor substrate; however, the areas already assigned to the power supply lines are prohibited from the signal lines, and the component logic gates are powered by the power supply network.

If a semicustom-made integrated circuit is manufactured through a standard cell technology, the power supply lines have been already provided in the function blocks, and the power supply lines of the function blocks are sequentially coupled with one another in the design work for the customer so that the power supply network is stretched all over the semicustom-made integrated circuit.

Figure 1:
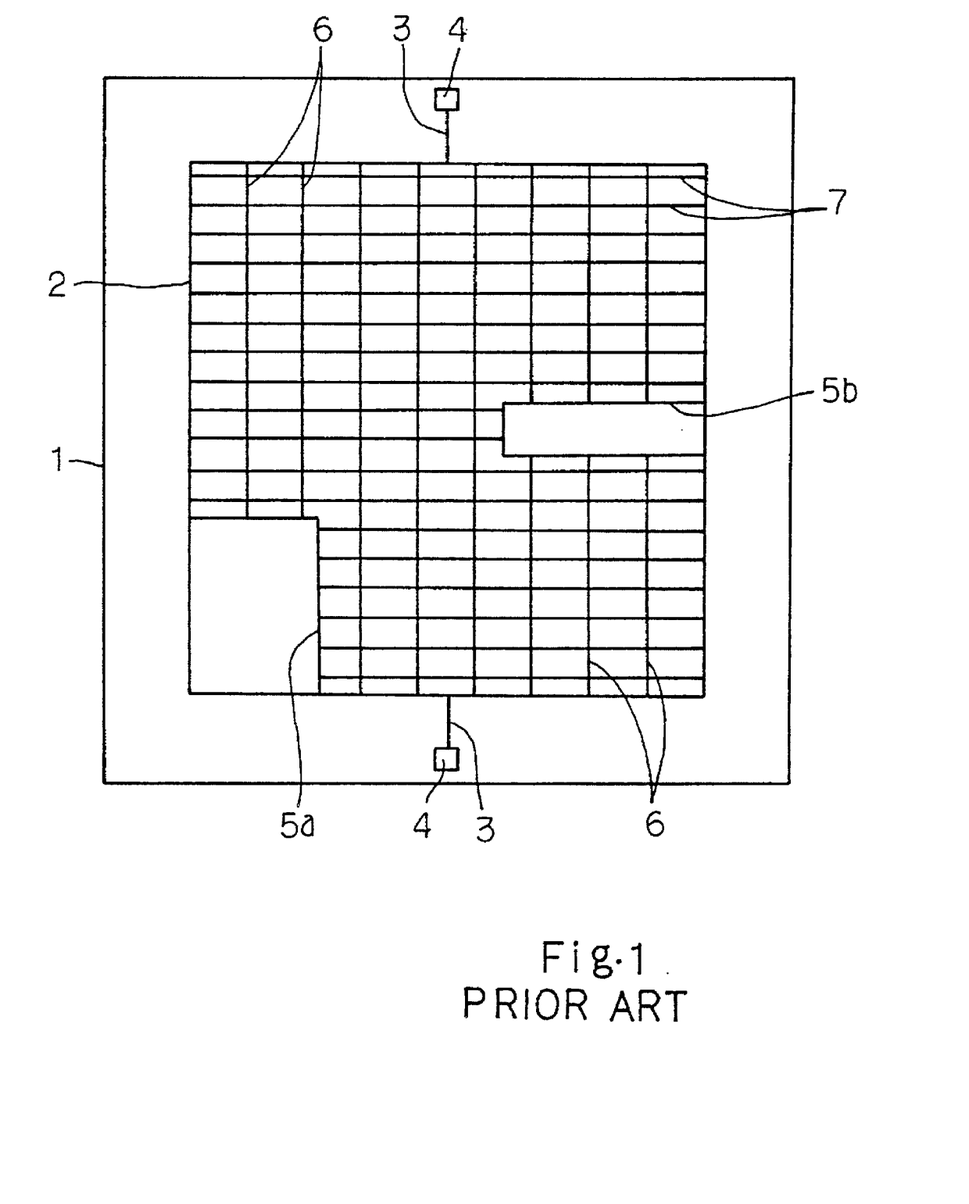
FIG. 1 is a view showing the image on the screen of the CAD system in the step of arranging power supply network between function blocks.

FIG. 1 illustrates an image on a screen of a CAD system produced in a step of arranging power supply network between function blocks, and a semi-custom made integrated circuit device is designed through the standard cell technology. Reference numeral 1 designates a semiconductor chip where the semi-custom made integrated circuit device is fabricated. A peripheral power supply line 2 is looped along the periphery of the semiconductor chip 1, and is coupled through in-coming lines 3 with bonding pads 4 assigned to an external power voltage. Macro-blocks such as a read-only memory block and a random access memory block are arranged inside the peripheral power supply line 2, and have peripheral power supply lines 5a and 5b. Power supply lines 6 are further provided inside the peripheral power supply line 2, and extends fixedly along predetermined routes. In the macro-blocks, the power supply lines 7 are available for distributing the power voltage level, and these power supply lines 2, 3, 5a, 5b, 6 and 7 are built-in power supply lines already arranged. However, the designer can rearrange some power supply lines, and completes the power supply network.

Even through the designer determines the arrangement of the power supply network, the design work on the power supply network is not completed. The designer calculates the amount of current passing through the rearranged power supply lines, and determines the widths of the rearranged power supply lines. If the semi-custom made integrated circuit device is implemented by complementary inverter circuits or CMOS transistors, the amount of current consumed is depending upon the frequency of switching actions of the CMOS transistors, and the designer determines the widths of the rearranged power supply lines on the basis of the amount of current calculated from the switching frequency. However, the designer does not check the built-in power supply lines 2 to 7 to see whether or not the widths are appropriate.

If, on the other hand, the semi-custom made integrated circuit device is designed in accordance with the gate array technology, the power supply network is fabricated from the built-in power supply lines only, and the widths of the power supply lines are proportionally increased or decreased.

In general, the semiconductor chip is divided into a plurality of areas, and the plurality of areas are broken down in a large consuming area and an economical area on consumption. The large consuming area has active circuit components operative at the maximum frequency, and the current consumption per unit area is large. On the other hand, few active circuit components are fabricated in the economical area, and the current consumption per unit area is minimum.

The progressive device technology promotes the integration density on a semiconductor chip and the switching frequency of the component transistors, and the areas broken down in the large consuming area are increased. This results in increase of the current consumption, and the increase of current consumption is causative of electro-migration. For this reason, the designer is expected to check the resistance against the electromigration for individual power supply lines.

If the power supply network is fabricated from the built-in power supply lines only, the routes and the widths are individually unchangeable, and the increase of current consumption requests the power supply network to be scaled up, and the power supply lines in the economical area become too wide to supply a small amount of current consumed therein. This results in increase of the semiconductor chip. If, on the other hand, the current passing through a power supply line exceeds an allowable range calculated from the line width, the electromigration tends to take place in the power supply line, and the reliability of the power supply line is deteriorated.

Even if the semi-custom made integrated circuit device is designed through the standard cell technology, the power supply network incorporated therein suffers from the trade-off between the scale-up and the low reliability, because the designer leaves the power supply lines except for rearranged lines original.

If all of the power supply lines were individually optimized by the designer, the power supply network would be free from the trade-off. However, a semi-custom made integrated circuit becomes too large and complex to be manually optimized by the designer, and the manual optimization is not feasible in view of time and labor. For this reason, the designer avoids concentration of function blocks fabricated from the active circuit components operative at the maximum frequency in the design work, and locally increases the line width associated with the unavoidably concentrated function blocks. However, such a counterplan is incomplete, and sometimes encounters mistakes made by human being.

Thus, the manual optimization is not practical, and the automatic design assisted by the CAD system does not take the total arrangement of semi-custom made integrated circuit into account.

SUMMARY OF THE INVENTION

It is therefore an important object of the present invention to provide a method of optimizing a power supply network which minimizes the occupation area assigned to the power supply network without sacrifice resistance against electromigration.

To accomplish the object, the present invention proposes to produce a current consumption map through a simulation.

In accordance with the present invention, there is provided a method for optimizing a power supply network incorporated in a semiconductor integrated circuit device fabricated on a semiconductor chip, comprising the steps of: a) preparing a data base including pieces of interconnecting data each indicative of a set of signals supplied to one of a plurality of function blocks available for the semiconductor integrated circuit device, and pieces of test vector data respectively associated with the pieces of interconnecting data and each indicative of variation of the set of signals; b) estimating electric power consumptions for predetermined function blocks selected from the plurality of function blocks through simulation on the basis of pieces of interconnecting data and pieces of test vector data for the predetermined function blocks; c) arranging images respectively indicative of the predetermined function blocks in an image indicative of a major surface of the semiconductor chip for producing a floor plan, the major surface having a central area for the predetermined function blocks and a peripheral area surrounding the central area; d) producing a power consumption map by inserting contour lines respectively indicative of magnitudes of power consumption determined on the basis of the estimated power consumption into the floor plan; e) determining routes of power supply lines passing through local maximum values of the estimated power consumptions or through neighborhoods thereof; f) determining in-coming points on the boundary between the central area and the peripheral area, external electric power being supplied through the in-coming points to a power supply network; g) determining an entire route of the power supply network; h) determining a width of each power supply line forming a part of the power supply network on the basis of the amount of estimated current passing therethrough; and i) repeating the steps g) and h) when one of the power supply lines of the power supply network is not feasible.

BRIEF DESCRIPTION OF THE DRAWINGS

The features and advantages of the method of optimizing a power supply network according to the present invention will be more clearly understood from the following description taken in conjunction with the accompanying drawings in which.

DESCRIPTION OF THE PREFERRED EMBODIMENTS

First Embodiment

Figure 2:
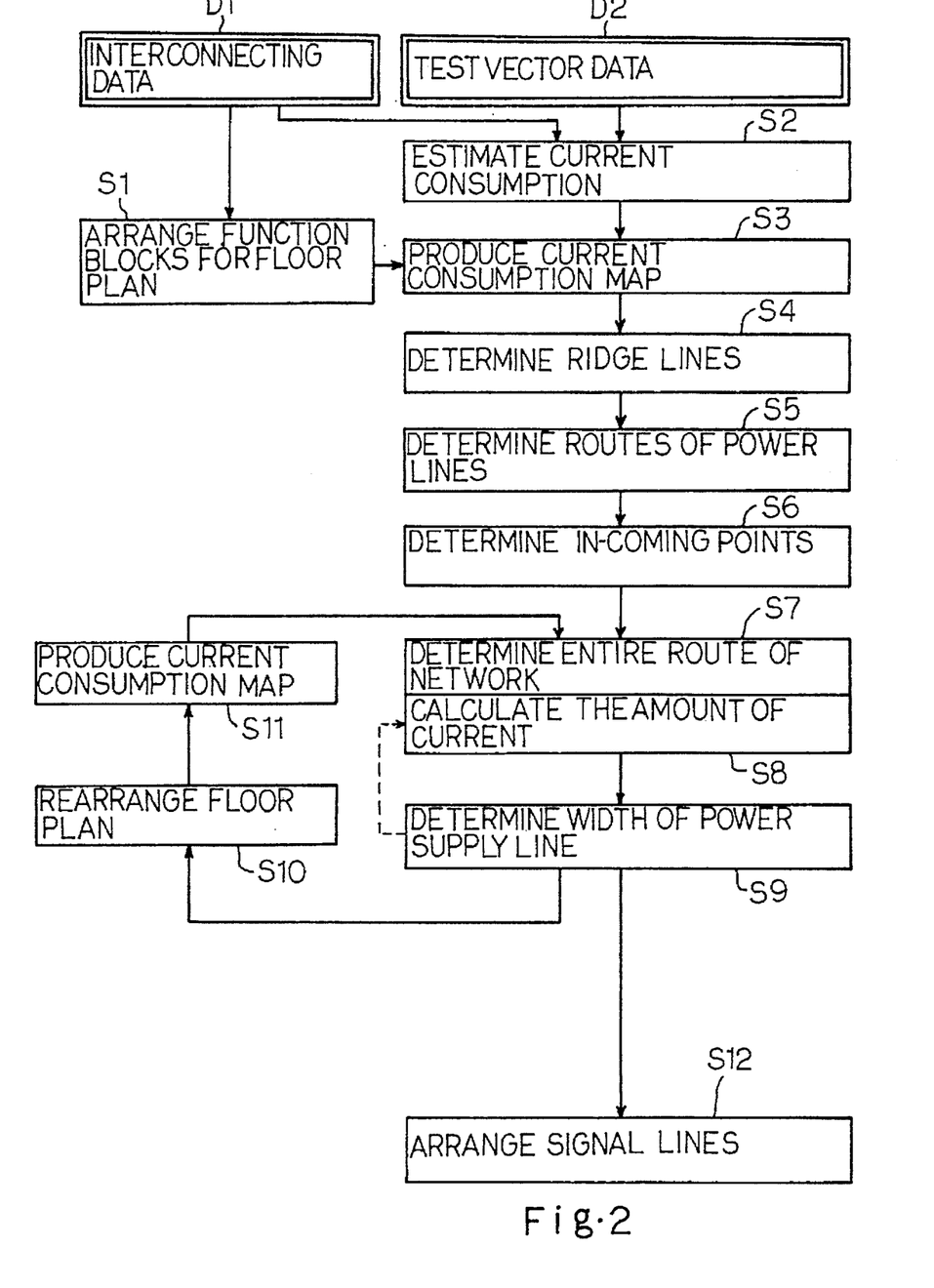
FIG. 2 is a flow chart showing a design sequence for optimizing a power supply network according to the present invention.

Referring to FIG. 2 of the drawings, a design sequence for optimizing a power supply network embodying the present invention starts with preparation of a data base. The data base contains interconnecting data D1 used for interconnecting function blocks available for a semi-custom made integrated circuit device and test vector data D2 used for estimating current consumption of each function block. The interconnecting data D1 are indicative of interconnections between the function blocks, and each piece of the test vector data D2 is indicative of variation of a set of input signals to one of the function blocks. If the semi-custom made integrated circuit is a CMOS implementation, the current consumption of each function block is dependent upon switching frequency, and the pieces of test vector data D2 contains timing information on a time scale. The data base is stored in a memory facility of a CAD system, and is accessible by a designer by means of a central processing unit of the CAD system.

Using the CAD system storing the data base, a designer starts optimizing a power supply network for a semi-custom made integrated circuit device. The designer is assumed to have already selected function blocks for the semi-custom made integrated circuit device. First, the designer sequentially accesses the interconnection data D1, and arranges the function blocks on a semiconductor chip as by step S1. However, the designer couples the function blocks through signal lines at this stage, but determines the locations of the function blocks so as to enhance the density of the signal lines on the semiconductor chip. If the semi-custom made integrated circuit has some function blocks operative in synchronism with one another at high speed, the function blocks should be located as close as possible, because the parasitic capacitances coupled with the signal lines become smaller.

Figure 3:
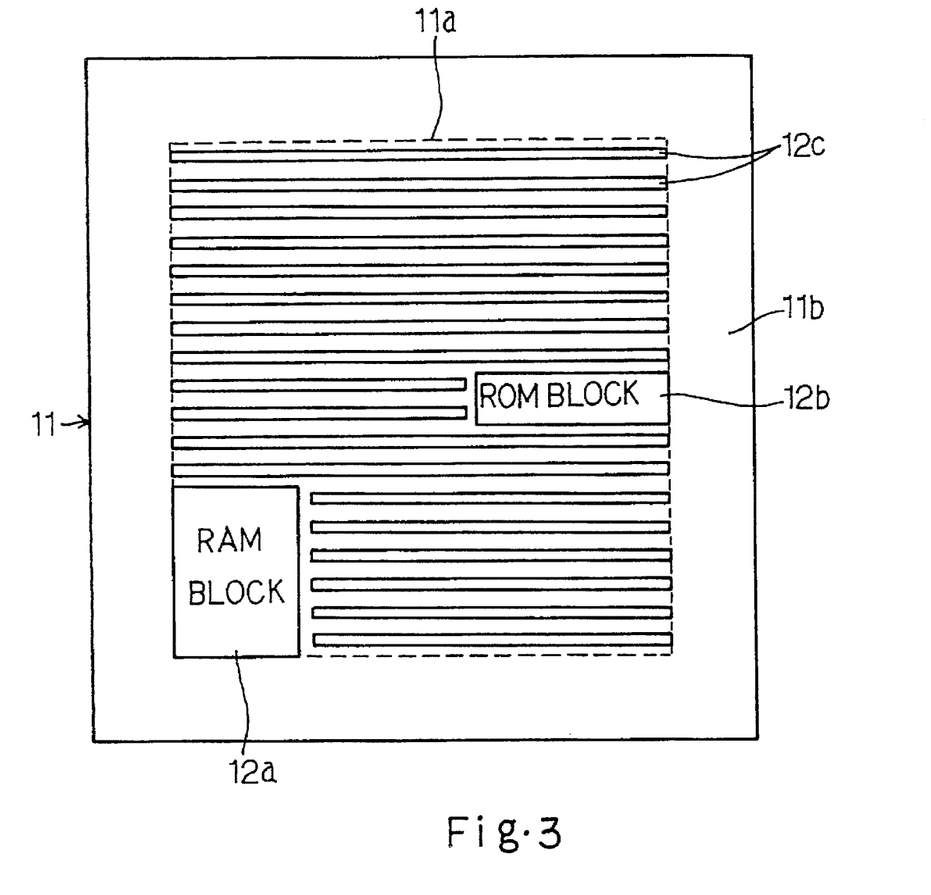
FIG. 3 is a view showing an image on a screen of a CAD system at a step of arranging function blocks on a semiconductor chip.

FIG. 3 illustrates an image on a screen of the CAD system, and shows the arrangement of function blocks on the semiconductor chip 11. The layout shown in FIG. 3 is called as "Floor Plan". On the semiconductor chip 11, a central area 11a is assigned to function blocks, and pads and input and output buffer circuits are arranged in the peripheral area 11b of the semiconductor chip 11. However, the pads and the input and output buffer circuits are deleted from the image of the semiconductor chip 11. In this instance, a random access memory block 12a, a read only memory block 12b and other function block array 12c are arranged in the central area 11a, and the other function block array is implemented by arrays of poly-cells. Although the arrays of poly-cells are indicated by narrow strip-like boxes without vacancy, the arrays of poly-cells do not occupy throughout the central area 11 in any instance.

Turning back to FIG. 2, the designer accesses the test vector data D2, and makes the CAD system estimate current consumption for each function block as by step S2. The words "current consumption" is hereinbelow equivalent to power consumption. In detail, the CAD system applies a piece of the test vector data for a given function block to the piece of interconnecting data indicative of the interfaces of the given function block, and simulates circuit behaviors of the given function block. While simulating the circuit behaviors, the CAD system estimates the current consumption, and stores the current estimation in the memory unit thereof. The CAD system repeats the estimation for all of the function blocks, and the estimated current consumptions are stored in the memory unit in relation to the function blocks.

Figure 4:
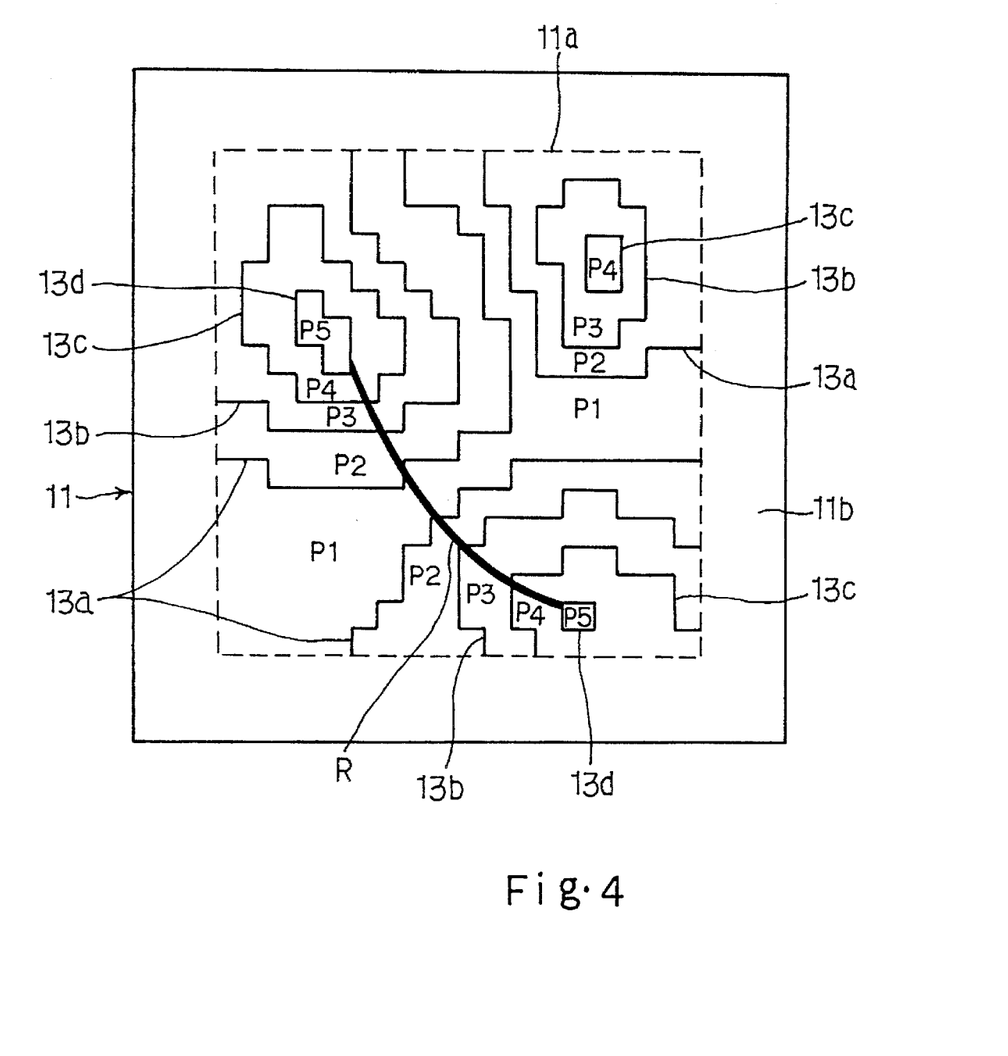
FIG. 4 is a view showing a current consumption map displayed on the screen of the CAD system at a step of producing a current consumption map.

When the estimation and the block arrangement are completed, the designer requests the CAD system to produce a current consumption map as by step S3. FIG. 4 shows the current consumption map. In order to produce the current consumption map, the CAD system virtually plots the estimated values on the image shown in FIG. 3, and couples the estimated values approximately equal to one another through a contour line 13a, 13b, 13c or 13d. The area between two contour lines is assigned to function blocks approximately equal in current consumption, and the magnitudes of the current consumption are indicated by "P1", "P2", "P3", "P4" and "P5", respectively. In this instance, "P1" is indicative of the minimum current consumption, and "P5" stands for the maximum current consumption.

Turning back to FIG. 2 of the drawings, the CAD system looks for local maximum values of the estimated current consumptions, and determines ridge lines drawn via the local maximum values as by step S4. While looking for the local maximum values, the CAD system sequentially retrieves the estimated current consumptions, and compares a current value with a new value. If the new value is larger than the current value, the current value is replaced with the new value, and becomes the current value. The current value thus replaced with the previous current value is compared with a next new value, and the CAD system sequentially compares the estimated current consumptions plotted in a predetermined direction on the map. If a new value is smaller than the current value, the current value is the local maximum value. In this way, the CAD system two-dimensionally compares the estimated current consumptions, and determines the local maximum values. When the local maximum values are plotted on the map, the ridge lines are drawn in such a manner as to pass through the local maximum values. One of the ridge lines is drawn in FIG. 4, and is labeled with "R".

Subsequently, the CAD system determines appropriate routes of power supply lines of a power supply network as by step S5 and appropriate in-coming points on the boundary between the peripheral area 11b and the central area 11a as by step S6. In-coming lines are coupled at the in-coming points with the power supply network. Though not shown in the drawings, the in-coming lines are coupled with pads assigned to external power voltages as similar to the prior art shown in FIG. 1. As described hereinbefore, the CAD system has already drawn the ridge lines, and the ridge lines usually extend zigzag. However, it is desirable for the power supply network to be constituted by straight power supply lines arranged in lattice, and the CAD system looks for straight routes as close to the ridge lines as possible. A typical route selection is carried out as follows. First, typical orthogonal straight lines are assumed in the central area 11a, then determining the minimum distances to a crossing point of the typical orthogonal straight lines in two directions different at right angle, then tracing average positions of the zigzag lines with them. The straight lines thus determined are brought into contact with the boundary between the central area 11a and the peripheral area 11b, and the CAD system determines the in-coming points at the joints between the straight lines and the boundary. The straight lines are indicative of the routes of the power supply lines.

However, if arrangement in the peripheral area 11b does not allow the in-coming lines to couple with the power supply network at the in-coming points, the designer may change the in-coming points.

Figure 5:
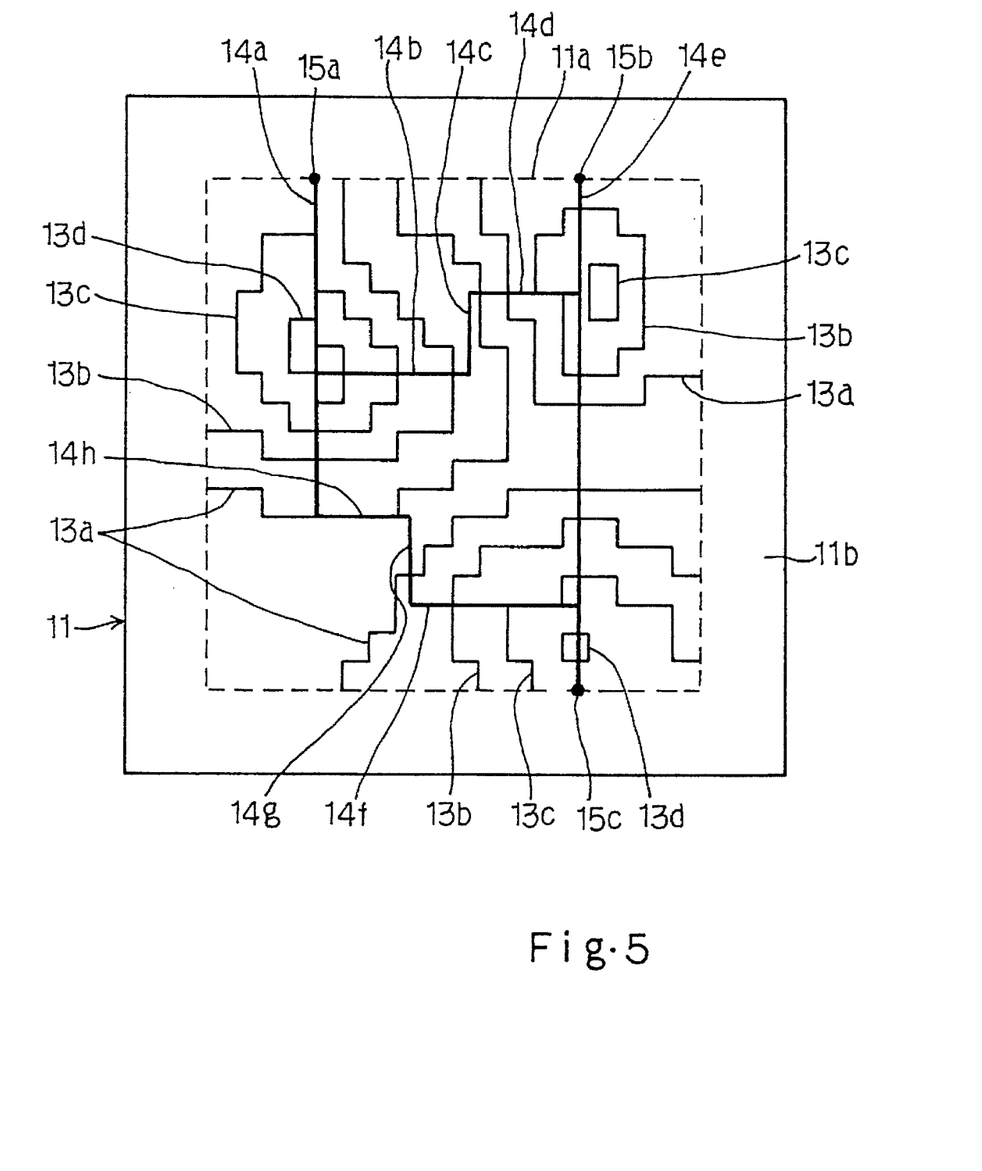
FIG. 5 is a view showing an image on the screen at a step of determining routes for power supply lines and incoming points on the boundary between a central area and a peripheral area of the semiconductor chip.

FIG. 5 shows routes for power supply lines inserted in the current consumption map, and the routes and the incoming points are labeled with 14a to 14h and with 15a to 15c, respectively. In this instance, the in-coming points 15a to 15c are arranged on the upper and lower edges of the boundary. This is because of the fact that pads (not shown) assigned to external power voltages are located along the upper and lower edges. Tough not shown in FIG. 5, the floor plan contains a built-in peripheral power supply line along the boundary, built-in peripheral lines along the periphery of macro-function blocks and built-in power supply lines provided throughout the poly-cell arrays which correspond to the peripheral power supply line 2, the peripheral power supply lines 5a and 5b and the power supply lines 7.

Figure 6:
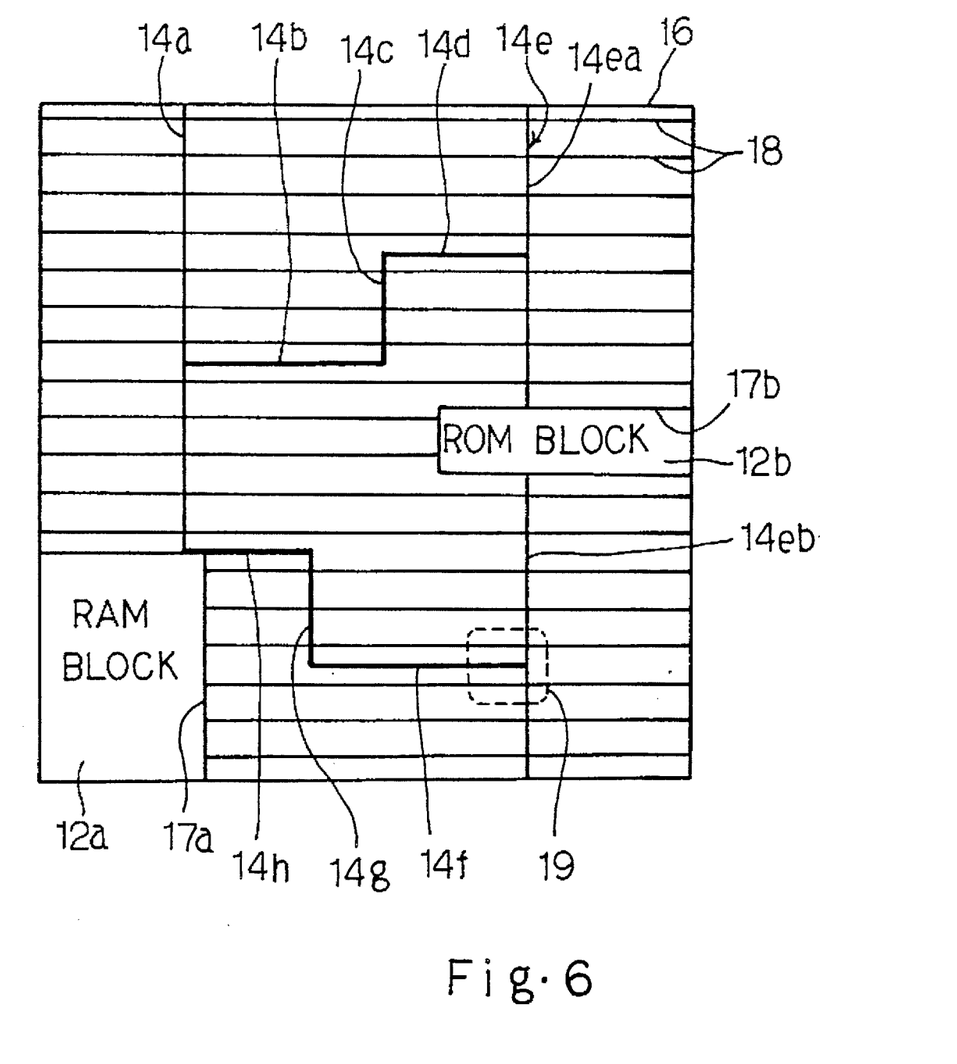
FIG. 6 is a view showing an image on the screen at a step of determining the entire route of a power supply network.

Turning back to FIG. 2, the designer requests the CAD system to determine entire route of a power supply network as by step S7. FIG. 6 shows in image of the power supply network on the screen of the CAD system, and the power supply network is fabricated from a built-in peripheral power supply line 16 along the boundary, built-in peripheral power supply lines 17a and 17b along the peripheries of the macro-function blocks 12a and 12b, built-in power supply lines 18 along the poly-cell arrays 12c and the straight power supply lines 14a to 14h. Although the power supply lines 14a to 14h and 16 to 18 are respectively represented by real lines, each power supply line consists of two juxtaposed power supply sub-lines electrically isolated from each other and respectively assigned to an external positive voltage Vdd and a ground voltage. The power supply line 14e is split into two sections 14ea and 14eb by the read only memory block 12b, because the power supply line 14e can not extend over the area assigned to the read only memory block 12b.

Figure 7:
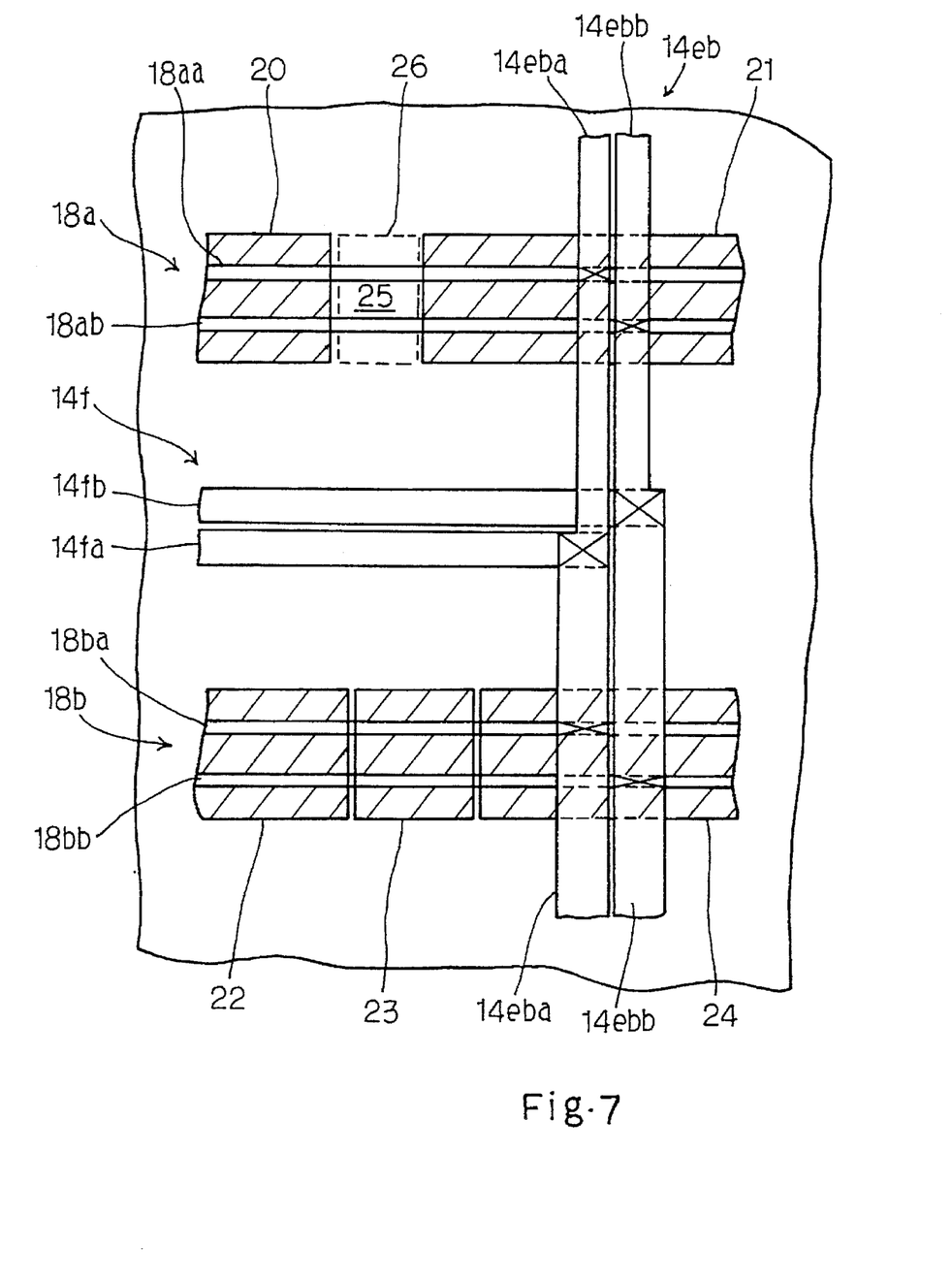
FIG. 7 is a view showing enlarged layout encircled by broken lines in FIG. 6.

FIG. 7 shows detailed layout encircled by broken lines 19, and reference numerals 20 to 24 designates function blocks, and the function blocks are hatched for easily discrimination from vacant areas such as that labeled with "25". An empty block 26 is assigned to the vacant area 25, and only has two juxtaposed power sub-lines for transferring the external positive voltage and the ground voltage. The power supply lines 14f and 14eb also has two juxtaposed power supply sub-lines 14fa and 14fb and 14eba and 14ebb, and two of the power supply lines 18 extend over vacant area on both sides of the power supply line 14f. The power supply lines 18a and 18b on both sides of the power supply line 14f extend over the function blocks 20 and 21 and the function blocks 22 to 24, respectively, and also have two juxtaposed power supply sub-lines 18aa and 18ab and two juxtaposed power supply sub-lines 18ba and 18bb, respectively. The route assigned to the power supply line 14eb is higher than the routes assigned to the power supply lines 18a, 14f and 18b, and is electrically coupled through contact holes formed in an inter-level insulating film therebetween. In FIG. 7, marks "X" are indicative of the locations of the contact holes. The power supply sub-lines 14fa, 14eba, 18aa and 18ba propagate the positive power voltage to the function blocks, and the power supply-sub-lines 14fb, 14ebb, 18ab and 18bb distribute the ground voltage level to the function blocks.

Turning back to FIG. 2 of the drawings, the CAD system calculates the amount of current passing through each of the power supply sub-lines on the assumption of typical resistance against current as by step S8, and changes the width of the power supply sub-line as by step S9 if the amount of current is too large to prevent the power supply sub-line from electromigration. The CAD system returns to the step S8, and calculates the amount of current again. Thus, the CAD system sequentially determines the widths of the power supply sub-lines through the trial-and-error method. If the semi-custom made integrated circuit is implemented by CMOS transistors, the impedance of each function block is much larger than the impedance of the power supply network, and it is appropriate to start the trial-and-error method with the typical resistance.

However, if a power supply sub-line is too wide to form over the semiconductor chip 11, the designer requests the CAD system to rearrange the floor plan as by step S10, and produces a new current consumption map as by step S11. Then, the CAD system returns to the step S7, and reiterates the loop consisting of the steps S7 to S11 until all the power supply sub-lines becomes feasible. Then, the CAD system proceeds to step S12, and arranges signal lines between the function blocks.

As will be appreciated from the foregoing description, the CAD system executes the program sequence representative of the method of optimizing the power supply network according to the present invention, and the CAD system tailors the power supply network to the semi-custom made integrated circuit device.

Second Embodiment

Figure 8:
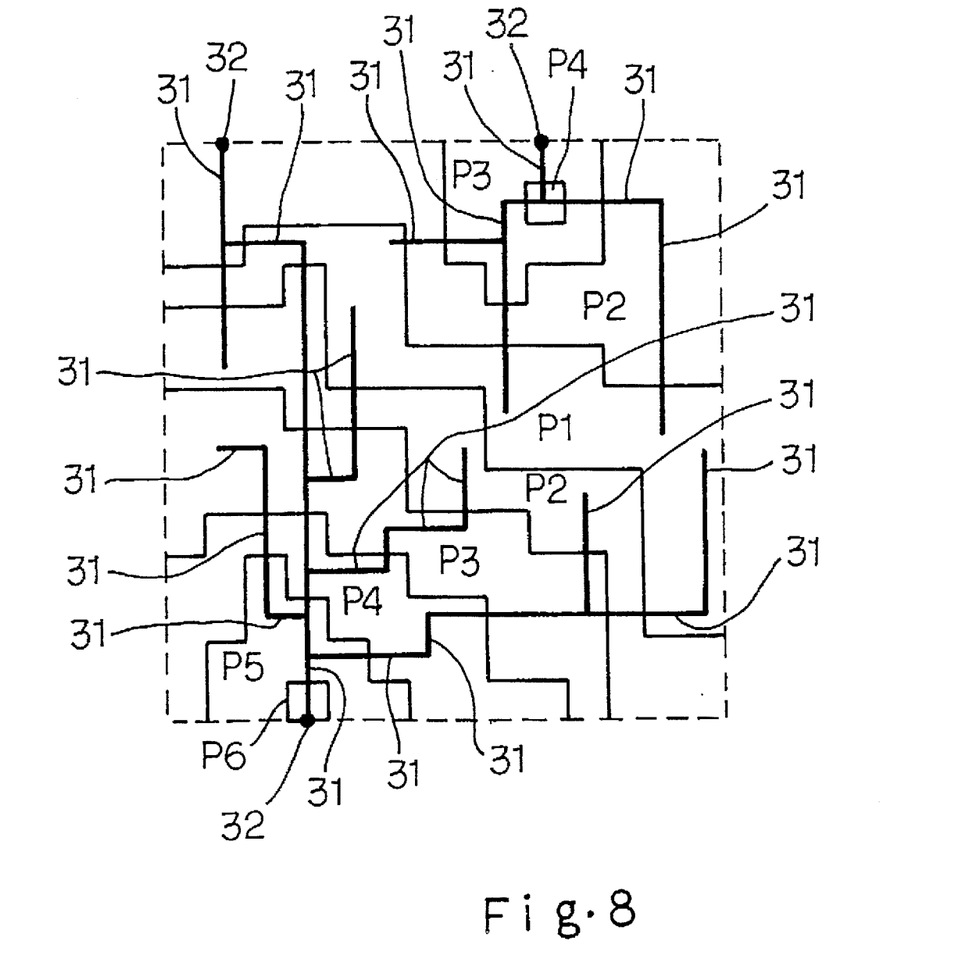
FIG. 8 is a view showing an image of power supply lines on a screen of a CAD system through another program sequence according to the present invention.

Turning to FIG. 8 of the drawings, thick real lines are indicative of power supply lines 31 tailored to another semiconductor integrated circuit device. As described hereinbefore, the power supply network incorporated in the first embodiment is fabricated from the power supply lines tailored thereto and the built-in power supply lines. However, the power supply network shown in FIG. 8 is fabricated from the power supply lines 31 only, and external power voltages are supplied through in-coming points 32 to the power supply network.

The power supply network shown in FIG. 8 is arranged in tree-like configuration. The tree-like configuration is desirable for the loop consisting of the steps S8 and S9, because any change of width is limited to a local network only. Moreover, the CAD system estimates current consumptions for component function blocks before arranging the component function blocks on a semiconductor chip. The component function blocks with large current consumptions are arranged in such a manner as to be closer to in-coming points, because the power supply network occupies smaller area rather than a network expected to supply current to a component function block with large current consumption away from the in-coming points.

Although particular embodiments of the present invention have been shown and described, it will be obvious to those skilled in the art that various changes and modifications may be made without departing from the spirit and scope of the present invention. The method according to the present invention is applicable to not only semicustom made integrated circuits but also any custom and standard semiconductor integrated circuit.

What is claimed is:

1. A method for optimizing a power supply network incorporated in a semiconductor integrated circuit device fabricated on a semiconductor chip, said power supply network having at least one loop, said method comprising the steps of:

a) preparing a data base including pieces of interconnecting data each indicative of a set of signals supplied to one of a plurality of function blocks available for said semiconductor integrated circuit device, and pieces of test vector data respectively associated with said pieces of interconnecting data and each indicative of a variation of said set of signals;

b) estimating electric power consumptions for predetermined function blocks selected from said plurality of function blocks, said estimation being made through a simulation on a basis of said pieces of interconnecting data and said pieces of test vector data for said predetermined function blocks;

c) arranging images respectively indicative of said predetermined function blocks in an image indicative of a major surface of said semiconductor chip for producing a floor plan, said major surface having a central area for said predetermined function blocks and a peripheral area surrounding said central area;

d) producing a power consumption map by inserting contour lines into said floor plan, said contour lines respectively indicative of magnitudes of power consumption determined on a basis of the estimated power consumptions;

e) determining routes of power supply lines passing through local maximum values of said estimated power consumptions or through neighborhoods thereof, one of said routes being looped;

f) determining in-coming points on the boundary between said central area and said peripheral area, external electric power being supplied through said in-coming points to a power supply network;

g) determining an entire route of said power supply network;

h) determining a width of each power supply line forming a part of said power supply network on a basis of an amount of estimated current passing therethrough, a width of branching power supply line being less than a width of a power supply line from which it is branched; and i) repeating steps g) and h) when one of the power supply lines of said power supply network is not feasible.

2. A method as set forth in claim 1, in which said steps a) to i) are sequentially executable by means of a computer system.

3. A method as set forth in claim 1, in which said power supply network comprises said power supply lines determined at said step e) and built-in power supply lines automatically determined at said step c) when said predetermined function blocks are arranged on said semiconductor chip.

4. A method as set forth in claim 1, in which said power supply network comprises said power supply lines determined at said step e), and said power supply lines are sequentially branched from predetermined power supply lines directly coupled with said in-coming points.

5. A method as set forth in claim 4, in which function blocks with large current consumptions are located at closer positions to said in-coming points rather than function blocks with small current consumptions.

6. A method for optimizing a power supply network incorporated in a semiconductor integrated circuit device fabricated on a semiconductor chip, comprising the steps of:

a) arranging images respectively indicative of predetermined function blocks in an image indicative of a major surface of said semiconductor chip for producing a floor plan, said major surface having a central area for said predetermined function blocks and a peripheral area surrounding said central area;

b) producing a power consumption map by inserting contour lines respectively indicative of magnitudes of power consumption determined on the basis of estimated power consumptions of predetermined function blocks into said floor plan;

c) determining routes of power supply lines passing through local maximum values of said estimated power consumptions or through neighborhoods thereof, a width of a branching power supply line being less than a width of a power supply line from which it branches; and d) determining in-coming points on the boundary between said central area and said peripheral area, external electric power being supplied through said in-coming points to a power supply network.

* * * * *